United States Patent
Liu et al.

(10) Patent No.: US 12,531,507 B2
(45) Date of Patent: Jan. 20, 2026

(54) FLEXIBLE PHOTOVOLTAIC BRACKET WITH IMPROVED MODULE FASTENER

(71) Applicant: ARCTECH SOLAR HOLDING CO., LTD., Kunshan (CN)

(72) Inventors: Haijun Liu, Kunshan (CN); Ying Yang, Kunshan (CN)

(73) Assignee: ARCTECH SOLAR HOLDING CO., LTD., Kunshan (CN)

( * ) Notice: Subject to any disclaimer, the term of this patent is extended or adjusted under 35 U.S.C. 154(b) by 0 days.

(21) Appl. No.: 18/942,761

(22) Filed: Nov. 10, 2024

(65) Prior Publication Data
US 2025/0253802 A1    Aug. 7, 2025

Related U.S. Application Data

(63) Continuation of application No. PCT/CN2024/107430, filed on Feb. 5, 2024.

(30) Foreign Application Priority Data

Apr. 11, 2024    (CN) .......................... 202410434222.8

(51) Int. Cl.
  *H02S 30/10*    (2014.01)
  *H02S 20/10*    (2014.01)
(52) U.S. Cl.
  CPC .............. *H02S 30/10* (2014.12); *H02S 20/10* (2014.12)
(58) Field of Classification Search
  CPC .................................. H02S 30/10; H02S 20/10
  See application file for complete search history.

(56) References Cited

FOREIGN PATENT DOCUMENTS

| | | | |
|---|---|---|---|
| CN | 216122288 U | | 3/2022 |
| CN | 217721065 | * | 11/2022 |
| CN | 217721065 U | | 11/2022 |
| CN | 218151949 U | | 12/2022 |
| CN | 218243396 | * | 1/2023 |
| CN | 218243396 U | | 1/2023 |
| CN | 218335820 U | | 1/2023 |
| CN | 218598726 U | | 3/2023 |
| CN | 220022657 U | | 11/2023 |
| CN | 220173173 | * | 12/2023 |
| CN | 220173173 U | | 12/2023 |
| CN | 117375488 A | | 1/2024 |

(Continued)

*Primary Examiner* — Jayne L Mershon
(74) *Attorney, Agent, or Firm* — Cheng-Ju Chiang

(57) ABSTRACT

A flexible photovoltaic bracket includes a number of upright columns, a number of cross beams, a load-bearing rope and a module fastener. The cross beam is correspondingly arranged on a top of the upright column. The load-bearing rope is fixedly connected to the cross beam and is extended between adjacent cross beams. The module fastener includes a pressing block, a fastening component and a clamping assembly. The pressing block and the fastening component are rotationally connected. A receiving cavity is formed between the pressing block and the fastening component for clamping and limiting the load-bearing rope. The pressing block includes a horizontal base plate portion and a hook portion configured to contact a photovoltaic module. The clamping assembly passes through the fastening component and the horizontal base plate portion, and is configured to be fixedly connected to a frame of the photovoltaic module.

20 Claims, 15 Drawing Sheets

(56) References Cited

FOREIGN PATENT DOCUMENTS

| | | |
|---|---|---|
| CN | 220382975 U | 1/2024 |
| CN | 220475645 U | 2/2024 |
| CN | 221151293 U | 6/2024 |
| CN | 221177639 U | 6/2024 |

* cited by examiner

FLEXIBLE PHOTOVOLTAIC BRACKET WITH IMPROVED MODULE FASTENER

CROSS-REFERENCE TO RELATED APPLICATIONS

The present disclosure is a bypass continuation-in-part of National Phase conversion of International (PCT) Patent Application No. PCT/CN2024/107430, filed on Jul. 25, 2024, which further claims priority of a Chinese Patent Application No. 202410434222.8, filed on Apr. 11, 2024 and titled "FLEXIBLE PHOTOVOLTAIC BRACKET", the entire content of which is incorporated herein by reference.

TECHNICAL FIELD

The present disclosure relates to the field of photovoltaic technology, in particular to a flexible photovoltaic bracket.

BACKGROUND

Existing flexible brackets for photovoltaic modules have fixing assemblies, such as fixing connecting rope structures. For example, Chinese Patent CN218243396U discloses a fixing assembly including a first plate body and a second plate body. The first plate body and the second plate body are rotationally connected. At least one of the first plate body and the second plate body defines a receiving groove. Both the first plate body and the second plate body define connection holes. The fixing assembly further includes a first connecting component. The first connecting component cooperates with the connection holes to enable the first plate body and the second plate body to tightly press a flexible connecting rope located in the receiving groove. The fixing assembly can be fixed with the flexible connecting rope. However, an upper end of the fixing assembly has no clamping limit for the photovoltaic module and is only fixed by bolts, so the connection is not firm. The fixing assembly forms an integral connection with the flexible bracket of the photovoltaic module, when the flexible bracket of the photovoltaic module vibrates due to external influences, it is easy to cause the photovoltaic module to tear.

SUMMARY

An object of the present disclosure is to provide a flexible photovoltaic bracket, which has beneficial effects of being easy to install, stable and reliable, and avoiding tearing of a photovoltaic module.

In order to achieve the above object, the present disclosure adopts the following technical solution: a flexible photovoltaic bracket, including:
- a plurality of load-bearing ropes;
- a plurality of module fasteners, each of the module fasteners including a pressing block, a fastening component and a clamping assembly; the pressing block and the fastening component being rotationally connected; a receiving cavity being formed between the pressing block and the fastening component to clamp and limit the load-bearing rope;
- a plurality of upright columns; and
- a plurality of cross beams, the cross beam being correspondingly arranged on a top of the upright column, the load-bearing rope being fixedly connected to the cross beam and being extended between adjacent cross beams;

wherein the pressing block includes a horizontal base plate portion and a hook portion extending upwardly from the horizontal base plate portion; the hook portion is configured to contact a photovoltaic module; the clamping assembly passes through the fastening component and the horizontal base plate portion, and is configured to be fixedly connected to a frame of the photovoltaic module.

The present disclosure also adopts the following technical solution: a flexible photovoltaic bracket, including:
- a plurality of load-bearing ropes;
- a plurality of module fasteners;
- a plurality of upright columns; and
- a plurality of cross beams, each cross beam being correspondingly fixed to a top of a corresponding upright column, each load-bearing rope being fixedly connected to the cross beam and being extended between adjacent cross beams;

wherein each of the module fasteners includes a pressing block, a fastening component and a clamping assembly; the pressing block and the fastening component are rotationally connected and together form a receiving cavity through which the load-bearing rope extends; the pressing block includes a horizontal base plate portion and a hook portion extending upwardly from the horizontal base plate portion; the hook portion is configured to hold a photovoltaic module; the clamping assembly passes through the fastening component and the horizontal base plate portion, and is configured to be fixedly connected to a frame of the photovoltaic module.

Compared with the prior art, the module fastener of the present disclosure is mainly pressed on the photovoltaic module through the hook portion on its top, so that the contact area with photovoltaic module is large and the photovoltaic module is more firmly fixed, thereby having the characteristics of convenient installation, stability and reliability. Using the module fastener of this structure, it allows each photovoltaic module to be set independently. When the photovoltaic module is vibrated by external influences, the flexible photovoltaic bracket of the present disclosure is able to prevent the photovoltaic module from tearing.

DETAILED DESCRIPTION

Figure 1:
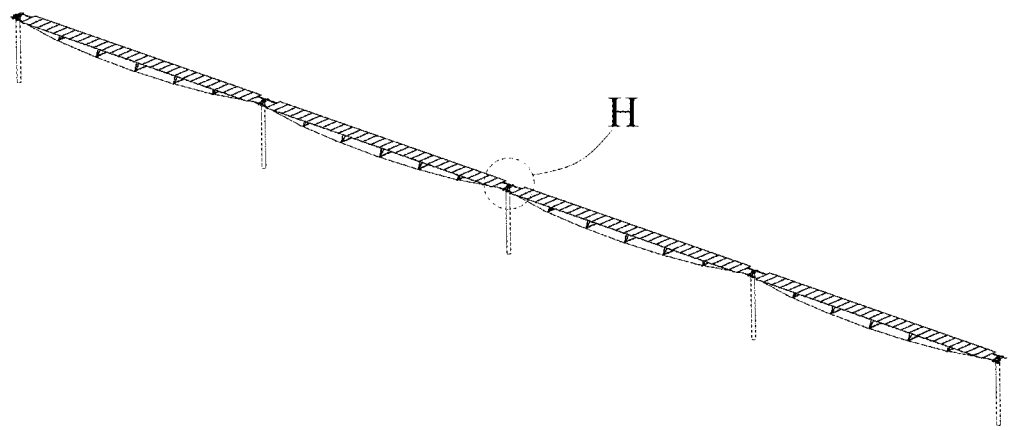
FIG. 1 is a schematic view of an overall structure of a flexible photovoltaic bracket of the present disclosure.

Exemplary embodiments of the present disclosure will be described in detail below with reference to the accompanying drawings. If there are several specific embodiments, features of these embodiments may be combined with each other provided there is no conflict. When the description refers to the drawings, the same numbers in different drawings refer to the same or similar elements, unless otherwise stated. The following description of exemplary embodiments does not represent all embodiments consistent with the present disclosure. Rather, they are merely examples of devices, products and/or methods consistent with aspects of the present disclosure as recited in the claims of the present disclosure.

The terminologies used in the present disclosure are only for the purpose of describing specific embodiments, and are not intended to limit the protection scope of the present disclosure. The singular forms "a", "said", and "the" used in the specification and claims of the present disclosure are also intended to include plural forms unless the context clearly indicates other meanings.

It should be understood that the terms "first", "second" and similar words used in the specification and claims of the present disclosure do not represent any order, quantity or importance, but are only used to distinguish different components. Similarly, "an" or "a" and other similar words do not mean a quantity limit, but mean that there is at least one. Unless otherwise noted, "front", "rear", "top", "bottom" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Referring to FIG. 1 to FIG. 19, the present disclosure discloses a flexible photovoltaic bracket, which includes a plurality of upright columns 4, a plurality of cross beams 5 and a plurality of load-bearing ropes 2. The upright columns 4 are used to support the cross beams 5 and the load-bearing ropes 2. The cross beam 5 is located at a top of the upright column 4. The number of upright columns 4 and cross beams 5 is multiple, and the upright columns 4 and the cross beams 5 are arranged correspondingly. The load-bearing ropes 2 are fixedly connected to the cross beams 5 and are extended between adjacent cross beams 5 to support photovoltaic modules 1. The flexible photovoltaic bracket further includes a plurality of module fasteners 3 for fixedly connecting the photovoltaic modules 1 to the load-bearing ropes 2. As is known to those skilled in the art, the photovoltaic module 1 includes a frame and a glass plate. The whole composed of the frame and the glass plate is called the photovoltaic module. The flexible photovoltaic bracket of the present disclosure does not include the photovoltaic module 1. In fact, the photovoltaic module 1 is an object served by the flexible photovoltaic bracket of the present disclosure.

Referring to FIG. 9 to FIG. 17, the module fastener 3 includes a pressing block 31, a fastening component 32, a clamping assembly 33 and a pivot assembly 34. The pressing block 31 includes a horizontal base plate portion 311, a hook portion 312 extending upwardly from the horizontal base plate portion 311, and a pair of vertical limiting plate portions 313 extending downwardly from the horizontal base plate portion 311. The hook portion 312 and the fastening component 32 are arranged correspondingly in a vertical direction. The fastening component 32 is pivotally connected to the pair of vertical limiting plate portions 313. That is, there is only one hook portion 312 of one module fastener 3. The hook portion 312 and the fastening component 32 are arranged correspondingly in the vertical direction, and are correspondingly located on opposite sides of the horizontal base plate portion 311. When the fastening component 32 is rotated and located below the horizontal base plate portion 311, the vertical limiting plate portions 313 and the fastening component 32 together form a receiving cavity 301 for clamping the limiting load-bearing rope 2. The hook portion 312 and the horizontal base plate portion 311 jointly form an opening slot 302. The opening slot 302 is used to accommodate the frame of the photovoltaic module 1. The hook portion 312 is used to contact an upper surface of the frame of the photovoltaic module 1. When the photovoltaic module 1 is affected by negative wind from the back, the hook portion 312 provides an upward limit for the photovoltaic module 1 to prevent the photovoltaic module 1 from detaching from the opening slot 302. Similarly, the horizontal base plate portion 311 contacts a bottom of the frame of the photovoltaic module 1 to provide a downward limit for the photovoltaic module 1. The flexible photovoltaic bracket of the present disclosure limits the load-bearing rope 2 and the photovoltaic module 1 through the cooperation between the vertical limiting plate portions 313 at a lower portion of the module fastener 3 and the fastening component 32, and the cooperation between the hook portion 312 at an upper portion of the module fastener 3 and the horizontal base plate portion 311. The module fastener 3 of the present disclosure is mainly pressed on the photovoltaic module 1 through the hook portion 312 on the top, so that a contact area with the photovoltaic module 1 is large and the photovoltaic module 1 is fixed more firmly. The present disclosure has the characteristics of convenient installation, stability and reliability. The flexible photovoltaic bracket of the present disclosure adopts the module fastener 3 of this structure, so that each photovoltaic module 1 can be set independently. Compared with connecting adjacent photovoltaic modules 1 to each other, when the photovoltaic module 1 is vibrated by external influences, the flexible photovoltaic bracket of the present disclosure can prevent the frame of the photovoltaic module 1 from tearing due to fluctuations caused by the external influences, thereby effectively increasing the service life of the photovoltaic module 1. In addition, one side of the horizontal base plate portion 311 is used to clamp and fix the photovoltaic module 1, and another side of the horizontal base plate portion 311 is used to clamp and fix the load-bearing rope 2. This effectively reduces a distance between the photovoltaic module 1 and the load-bearing rope 2, lowers a center of gravity of the photovoltaic module 1, and makes the structure of the flexible photovoltaic bracket more stable.

Referring to FIG. 9 to FIG. 12, the vertical limiting plate portion 313 includes a notch portion 3130 that opens downwardly. The fastening component 32 includes a recessed portion 323 that opens upwardly. The load-bearing rope 2 is embedded between the notch portion 3130 and the recessed portion 323. The recessed portion 323 is in an arc shape and the notch portion 3130 is in an inverted U shape so as to match the upper and lower contours of the load-bearing rope 2, respectively. Specifically, the notch portion 3130 includes an arc portion and vertical structures located on two sides of the arc portion. That is, the notch portion 3130 is in an inverted U shape. The arc-shaped structure of the notch portion 3130 matches the upper contour of the load-bearing rope 2, and the recessed portion 323 is arc-shaped and matches the lower contour of the load-bearing rope 2. The inverted U shape of the notch portion 3130 serves to provide a predetermined position for the load-bearing rope 2 during installation, thereby facilitating the installation of the load-bearing rope 2. On the other hand, the distance between the load-bearing rope 2 and the photovoltaic module 1 is further reduced, and the installation center of gravity of the photovoltaic module 1 is further reduced. The arc shape of the recessed portion 323 serves to support the load-bearing rope 2 after pre-positioning. When the clamping assembly 33 is tightened, the load-bearing rope 2 is firmly locked between the notch portion 3130 and the arc-shaped structure of the recessed portion 323. Therefore, the flexible photovoltaic bracket of the present disclosure essentially clamps and limits the load-bearing rope 2 through the cooperation between the vertical limiting plate portions 313 at the lower portion of the module fixing portion 3 and the fastening component 32.

Figure 11:
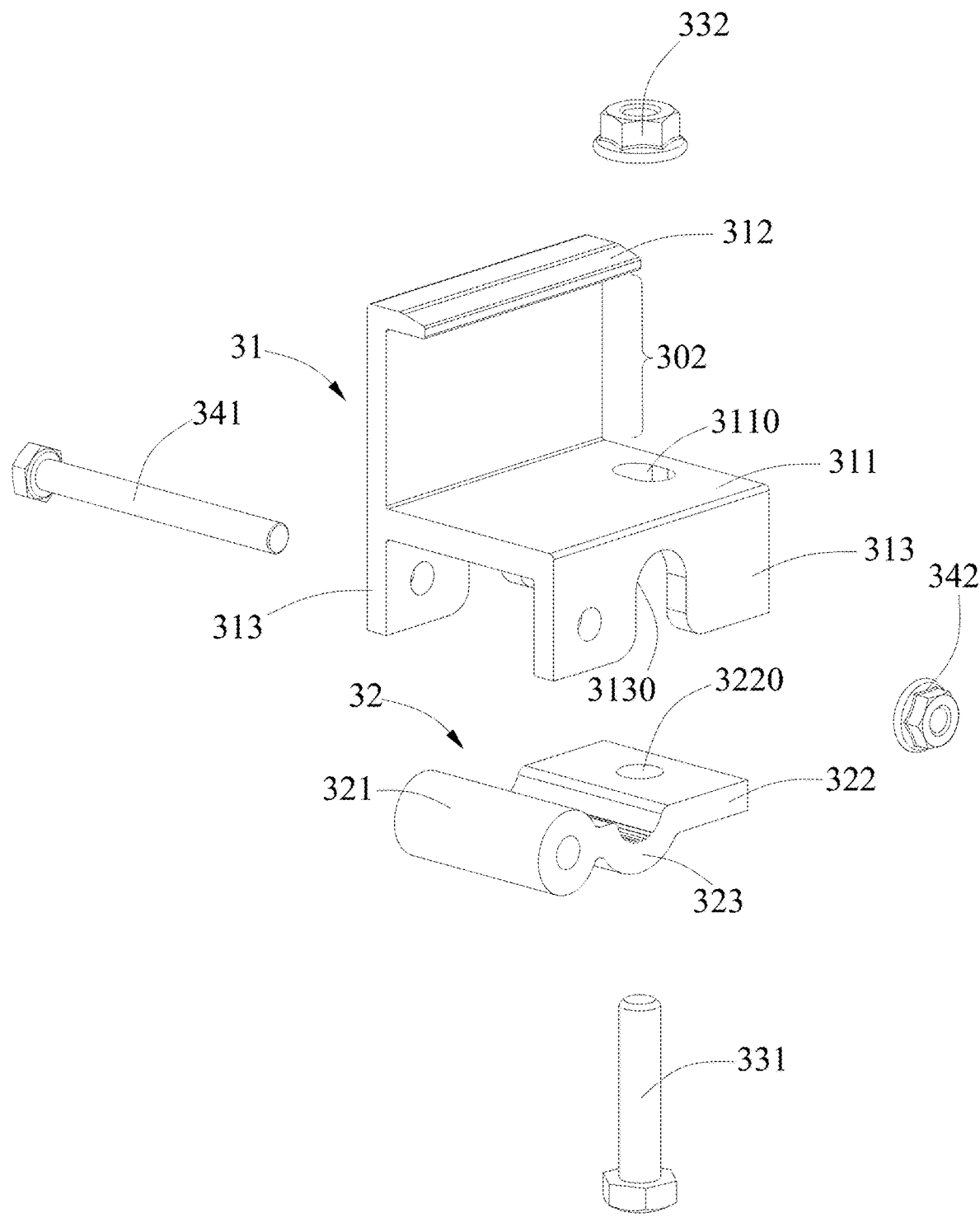
FIG. 11 is a perspective exploded view of the module fastener of the flexible photovoltaic bracket of the present disclosure.
Figure 12:
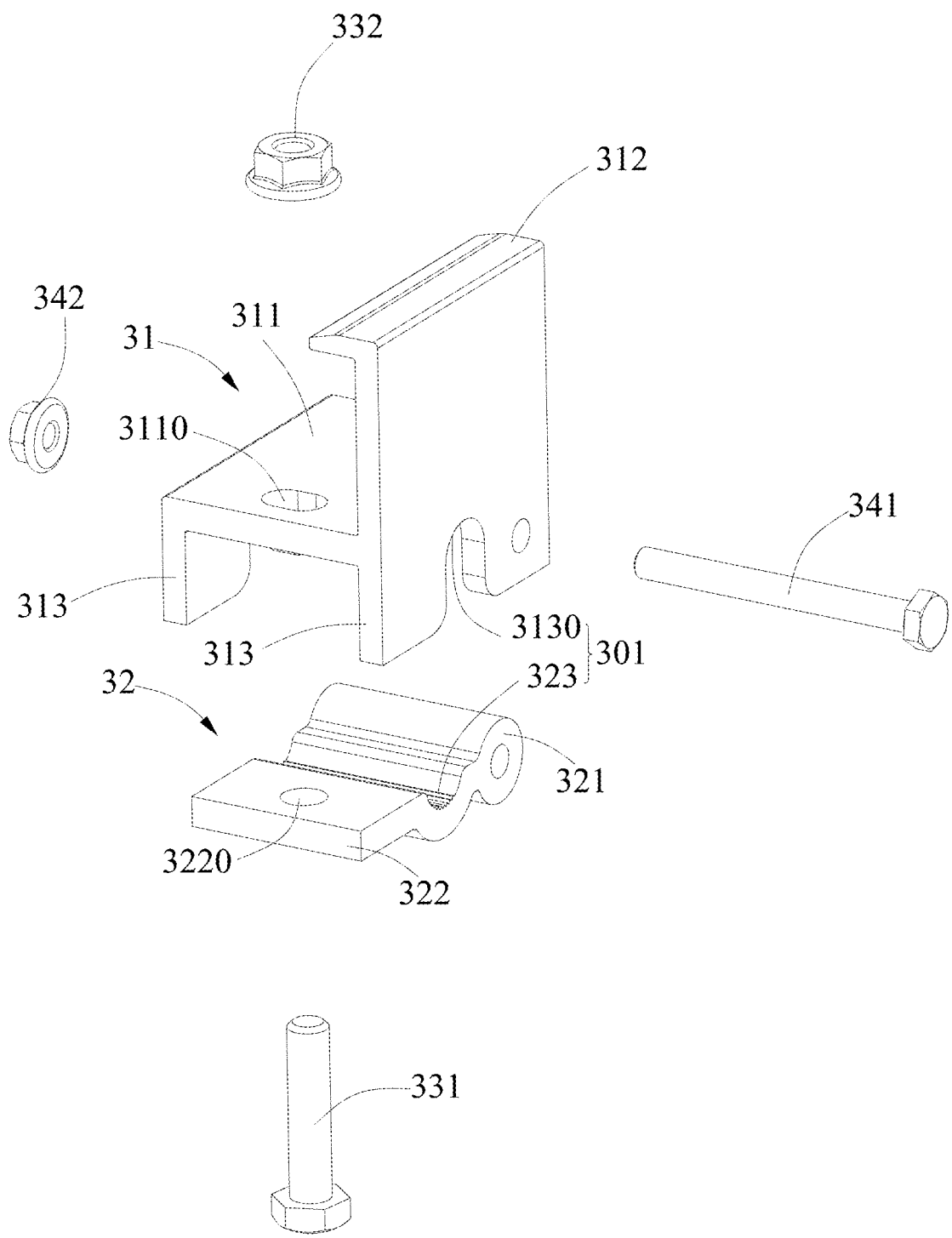
FIG. 12 is another perspective exploded view of the module fastener of the flexible photovoltaic bracket of the present disclosure.

Referring to FIG. 11 and FIG. 12, an inner surface of the recessed portion 323 is serrated in order to match a spiral structure of the load-bearing rope 2. The purpose of this arrangement is to increase the friction between the load-bearing rope 2 and the fastening component 32, and provide better and stronger clamping force for the load-bearing rope 2. One end of the fastening component 32 is a pivot end 321 and an opposite end is a free end 322. The recessed portion 323 is located between the pivot end 321 and the free end 322. That is to say, the specific position of the fastening component 32 that supports the load-bearing rope 2 is in the middle of the fastening component 32, which is beneficial to the shaping of the fastening component 32 and the provision of supporting force.

Figure 15:
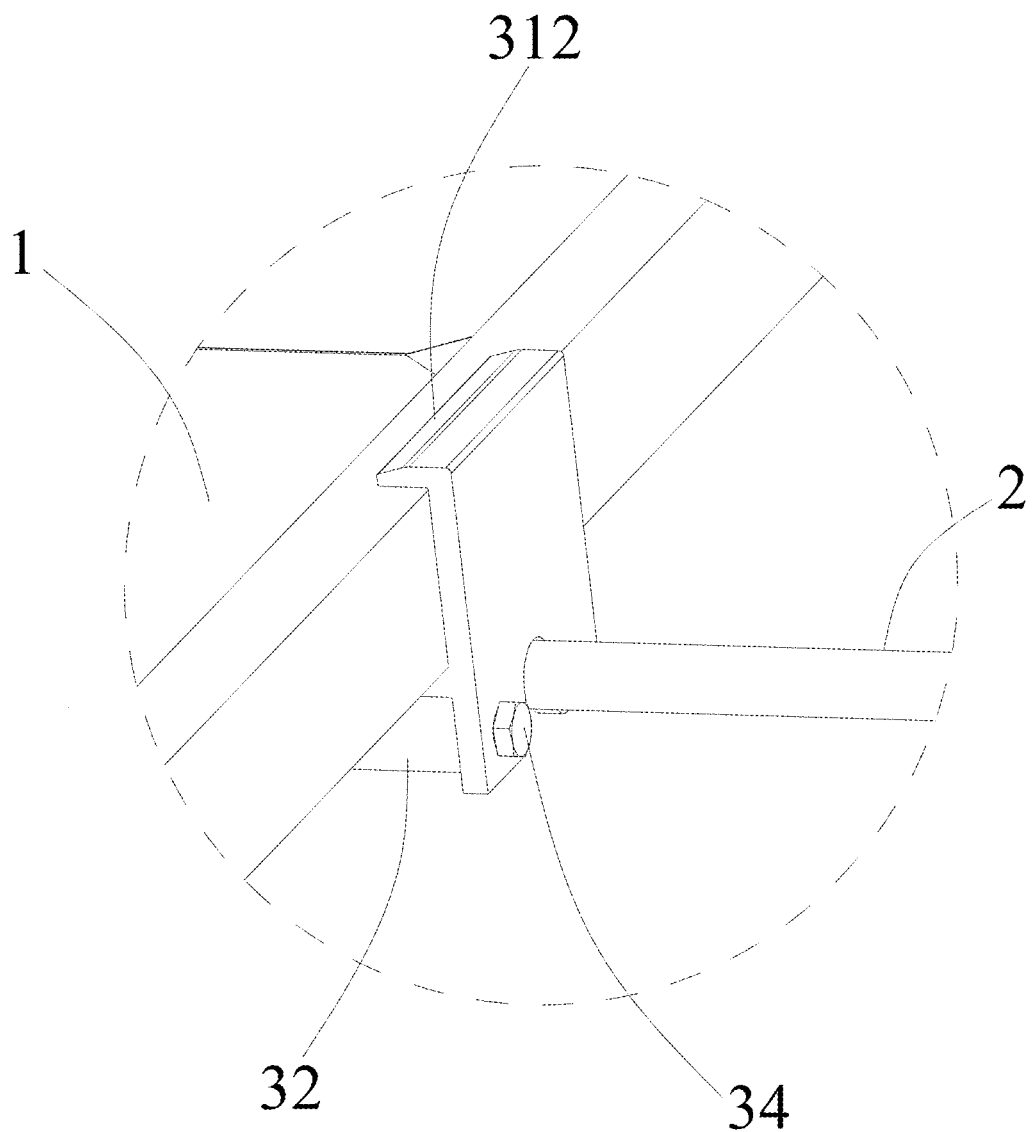
FIG. 15 is an enlarged view of part D in FIG. 3.
Figure 16:
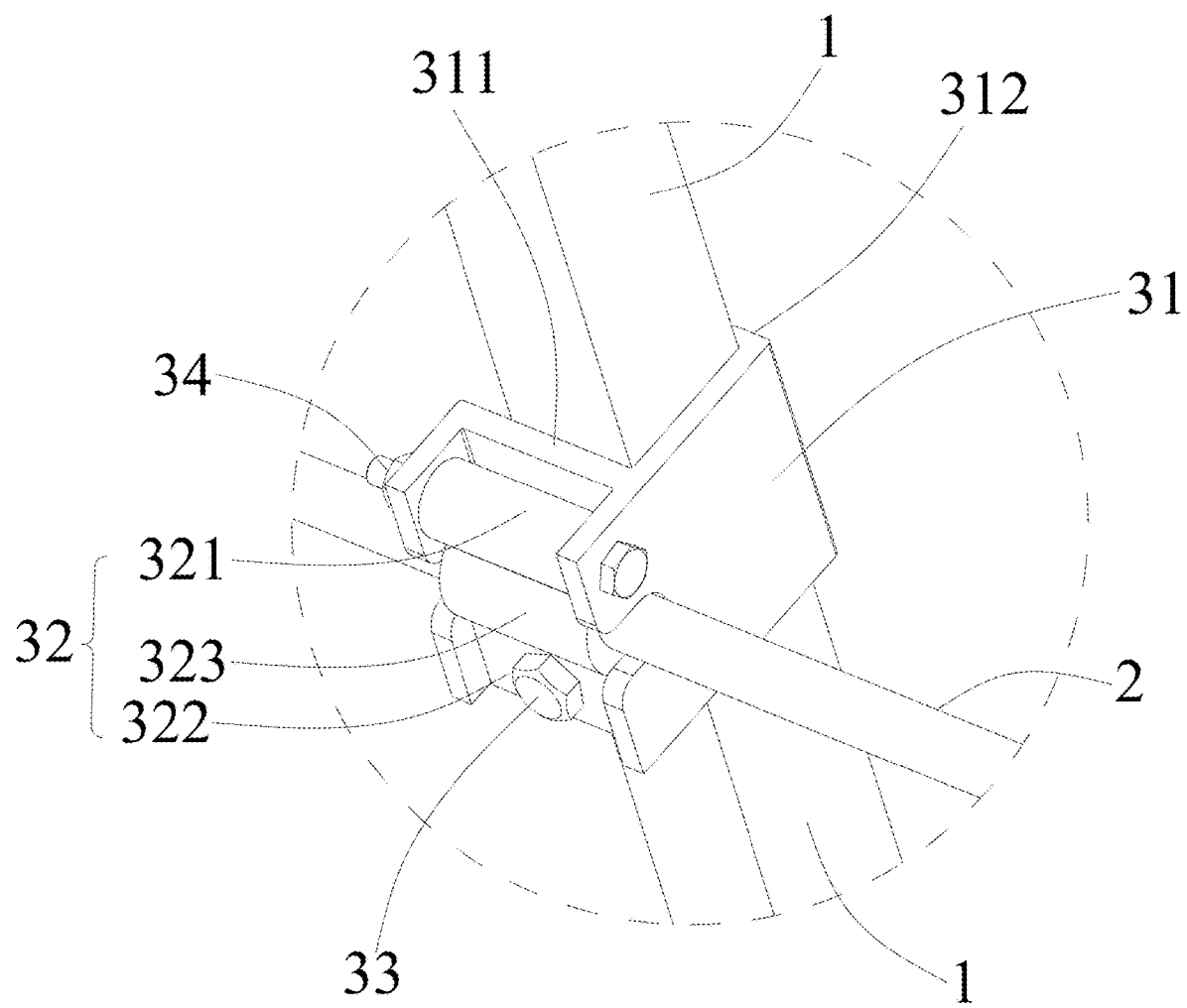
FIG. 16 is an enlarged view of part E in FIG. 4.
Figure 17:
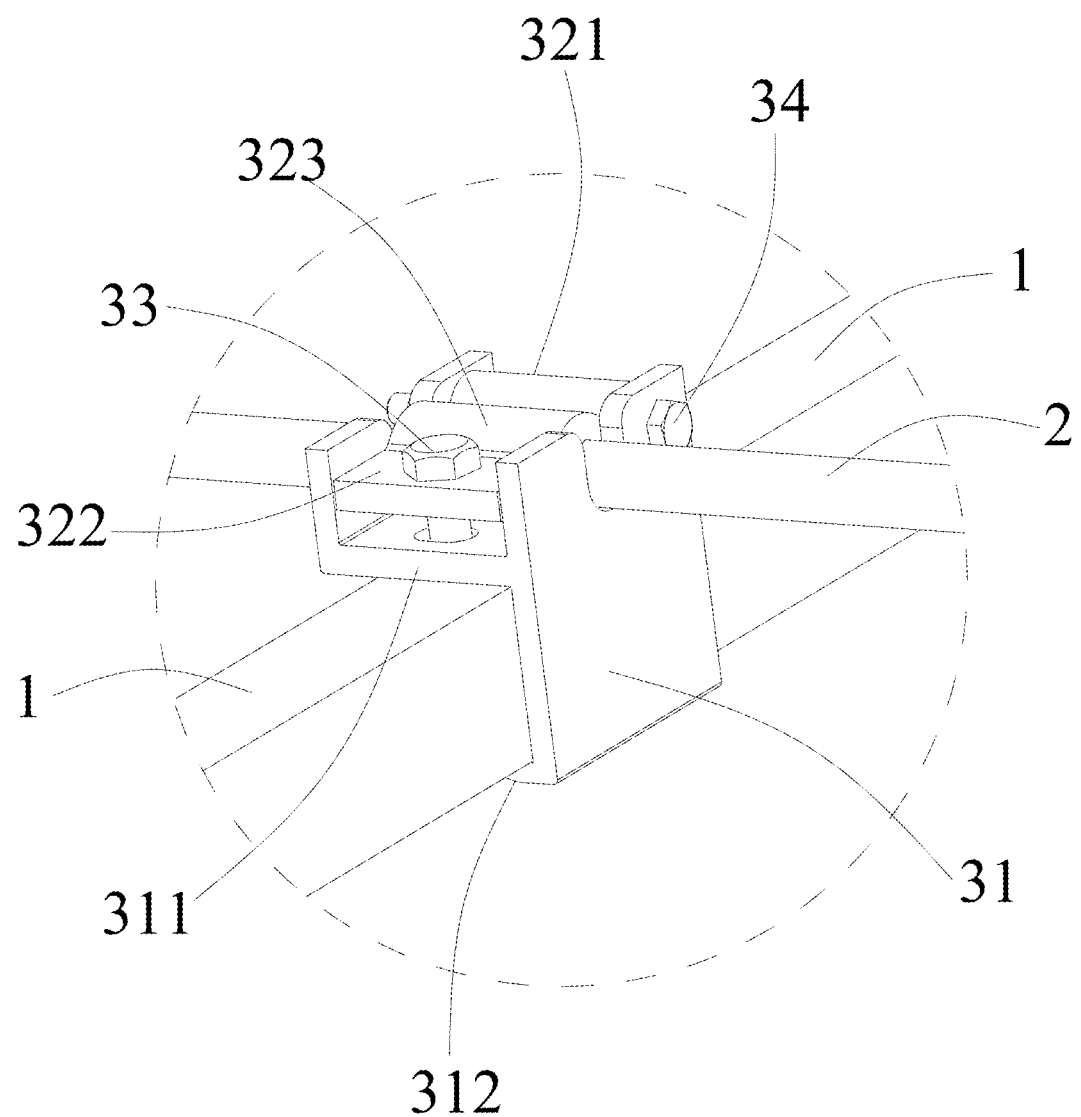
FIG. 17 is an enlarged view of part F in FIG. 5.
Figure 18:
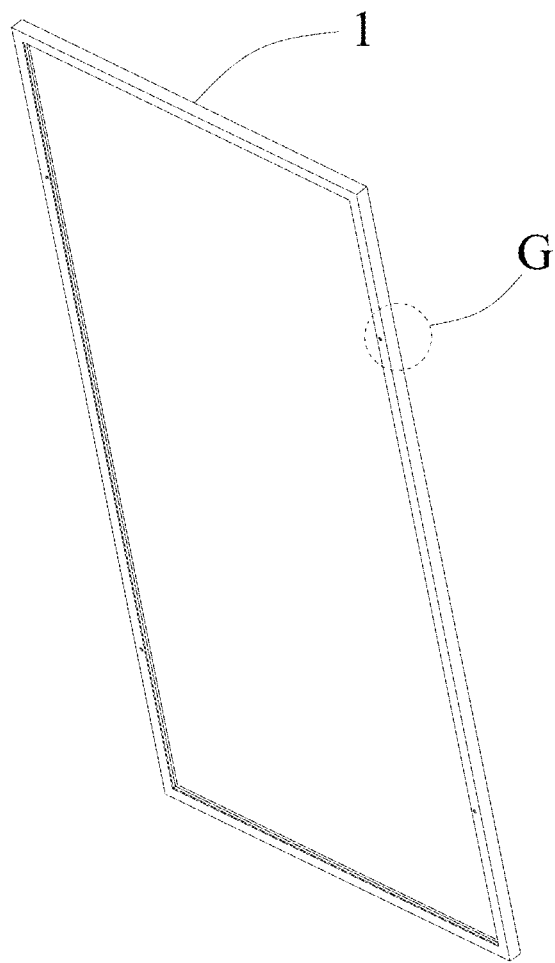
FIG. 18 is a perspective view of the photovoltaic module that is a service object of the flexible photovoltaic bracket of the present disclosure.
Figure 19:
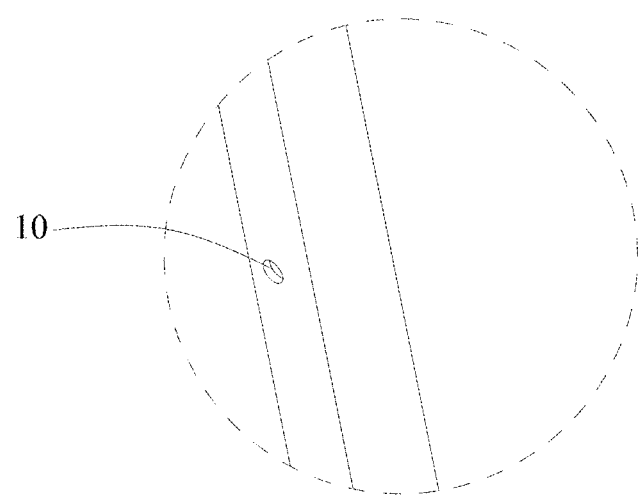
FIG. 19 is an enlarged view of part G in FIG. 18.

Referring to FIG. 17, the free end 322 is a flat plate portion. An upper surface of the free end 322 and a bottom surface of the horizontal base plate portion 311 can be abutted together with zero spacing. It can be understood that FIG. 15 shows a state of spacing before being close together. In the spaced state shown in FIG. 15, the clamping assembly 33 can also be screwed to achieve a zero-space state. Therefore, the fastening component 32 is rotated below the horizontal base plate portion 311 and the locking degree of the clamping assembly 33 is adjusted to zero distance, that is, it is clamped in place so that the load-bearing rope 2 will not loosen.

Referring to FIG. 9 to FIG. 17, the clamping assembly 33 includes a bolt element 331 and a nut element 332. The nut element 332 is sleeved on the bolt element 331. The horizontal base plate portion 311 defines a first connection hole 3110. The fastening component 32 defines a second connection hole 3220 (specifically, the second connection hole 3220 is provided on the free end 322). The bolt element 331 passes through the first connection hole 3110 and the second connection hole 3220. The flexible photovoltaic bracket of the present disclosure can tighten the load-bearing rope 2 in the receiving cavity 301 by tightening the clamping assembly 33, and can realize the connection and fixation of the pressing block 31, the fastening component 32, the load-bearing rope 2 and the photovoltaic module 1 through the clamping assembly 33, thereby having a simple structure and being easy to install. The pivot assembly 34 further includes a bolt component 341 and a nut component 342. The bolt component 341 is inserted through the pivot end 321 and exposed at both ends of the pivot end 321. The nut component 342 is sleeved on the bolt component 341. It should be emphasized that the difference between the nut component 342 and the nut element 332 is that the nut element 332 is specifically a hexagonal nut to facilitate screwing on the bolt element 331. The nut component 342 is a general nut, which only needs to be positioned at the end of the bolt component 341 to prevent it from coming off, and does not need to be screwed. Of course, the clamping assembly 33 and the pivot assembly 34 may not use the bolt and the nut. For example, the pivot assembly 34 can use a rod-shaped rotating shaft. After the rotating shaft passes through the pivot end 321, two ends of the rotating shaft are riveted into larger caps to prevent them from falling out. Other embodiments of the clamping assembly 33 are not listed.

Figure 13:
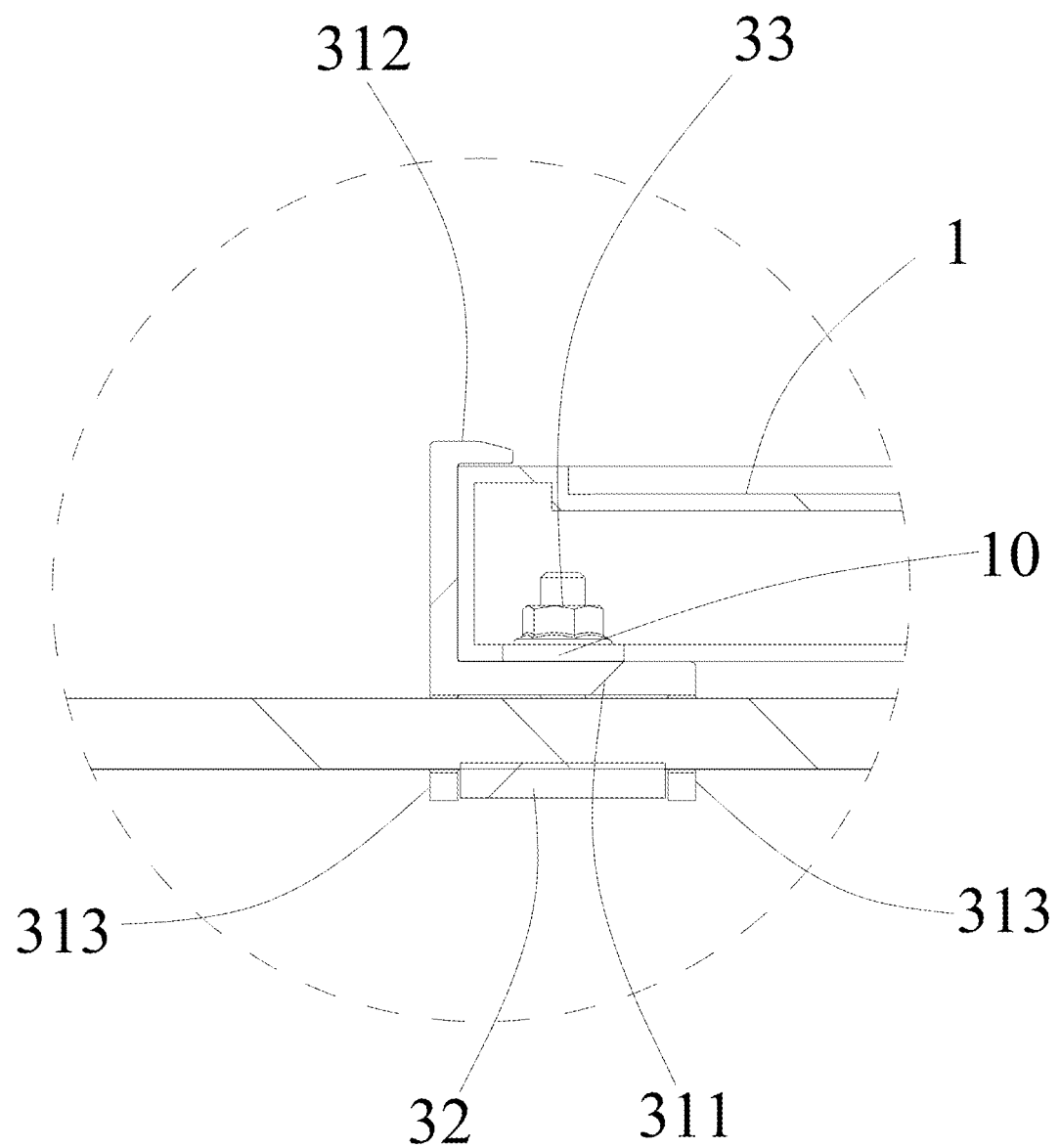
FIG. 13 is an enlarged view of part B in FIG. 7.
Figure 14:
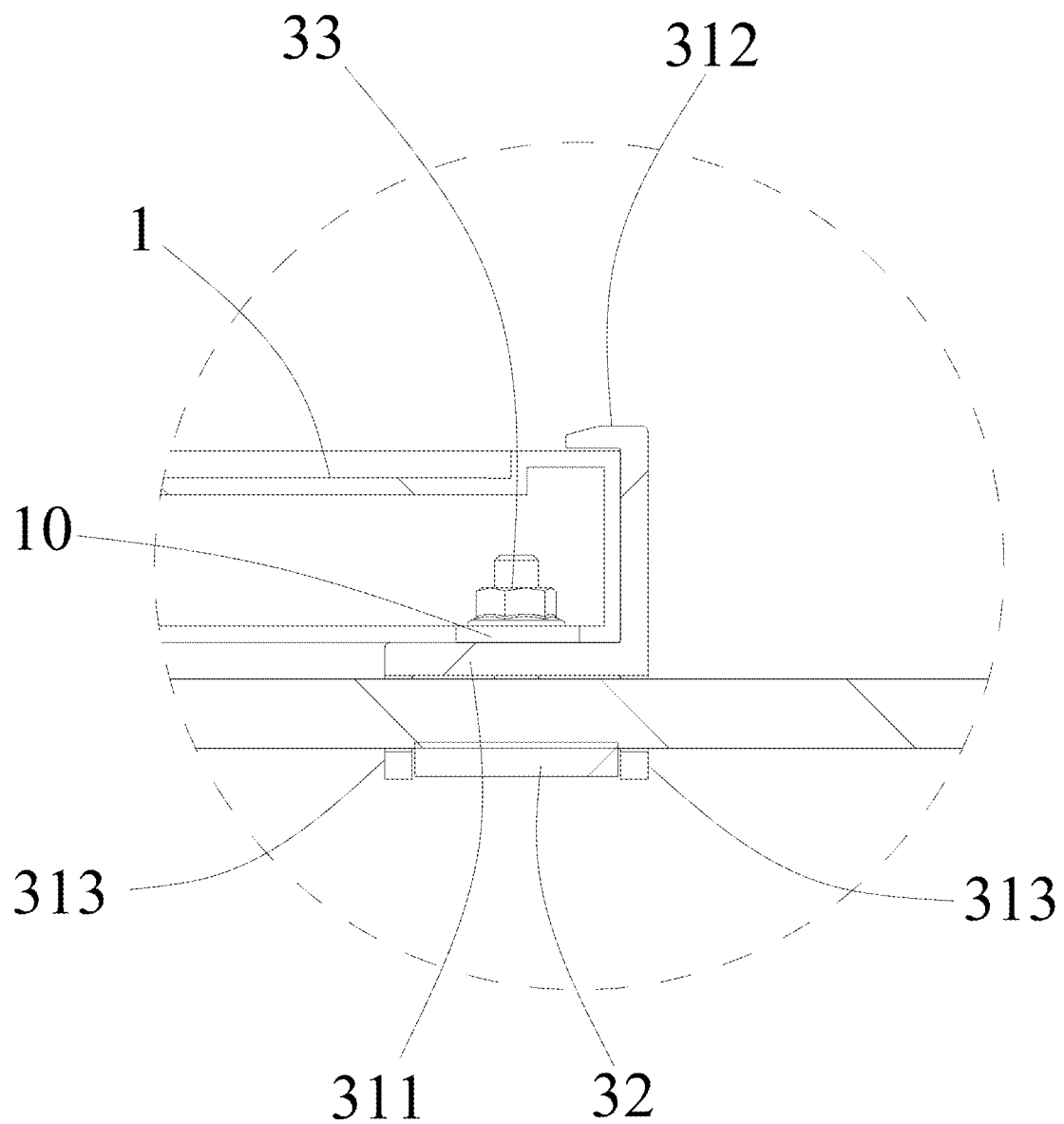
FIG. 14 is an enlarged view of part C in FIG. 7.

Referring to FIG. 13 and FIG. 14, the third connection hole 10 is provided at the bottom of the frame of the photovoltaic module 1. The bolt element 331 passes through the first connection hole 3110 and the second connection hole 3220 along the vertical direction, and further extends into the third connection hole 10. With this arrangement, one end of the fastening component 32 is pivotally connected through a hinge bolt (the bolt component 341), and the other end of the fastening component 32 is fixed to the photovoltaic module 1 through the clamping assembly 33. The present disclosure requires fewer bolts for connection and can effectively reduce the overall center of gravity. In the present disclosure, the connection of the fastening component 32, the pressing block 31 and the photovoltaic module 1 can be achieved through the clamping assembly 33, thereby reducing the installation process and reducing labor costs.

Referring to FIG. 11, FIG. 12, FIG. 18 and FIG. 19, in the specific embodiment, the first connection hole 3110 is a waist-shaped hole; and the second connection hole 3220 and the third connection hole 10 are both round holes. In a preferred embodiment, both the first connection hole 3110 and the second connection hole 3220 are waist-shaped holes.

When both the first connection hole 3110 and the second connection hole 3220 are waist-shaped holes (not shown), longitudinally extending length directions of the first connection hole 3110 and the second connection hole 3220 are arranged in parallel. Axes of the first connection hole 3110 and the second connection hole 3220 are perpendicular to an axis of the third connection hole 10, which facilitates the installation of the clamping assembly 33 on the pressing block 31 and the fastening component 32.

When the first connection hole 3110, the second connection hole 3220 and the third connection hole 10 are all waist-shaped holes (not shown), the longitudinally extending length directions of the first connection hole 3110 and the second connection hole 3220 are arranged in parallel, and the axes of the first connection hole 3110 and the second connection hole 3220 are perpendicular to the axis of the third connection hole 10. The longitudinally extending length directions of the first connection hole 3110 (or the second connection hole 3220) and the third connection hole 10 are arranged perpendicular to each other, so that the module fastener 3 can adapt to the photovoltaic modules 1 of various sizes.

During assembly of the present disclosure, firstly, the photovoltaic module 1 is inserted into the opening slot 302 of the pressing block 31. At this time, the third connection hole 10 at the bottom of the frame of the photovoltaic module 1 corresponds to the first connection hole 3110 on the pressing block 31, and the photovoltaic module 1 is limited and clamped in the opening slot 302. Then, the load-bearing rope 2 passes through the notch portion 3130 (inverted U-shape) on the side of the pressing block 31 and then rotates the fastening component 32, so that the load-bearing rope 2 is restricted in the receiving cavity 301 formed by the notch portion 3130 (inverted U-shape) of the pressing block 31 and the recessed portion 323 (arc-shaped) of the fastening component 32. Finally, one end of the bolt element 331 is passed through the fastening component 32, the pressing block 31 and a bolt hole on the frame of the photovoltaic module 1 in sequence and tighten the nut element 332, so that the fastening component 32 is moved in a direction close to the pressing block 31 until it is aligned with the bottom surface of the pressing block 31. At this time, the fixation of the load-bearing rope 2 and the module fastener 3 is completed. In the present disclosure, the fastening component 32 and the pressing block 31 can rotate relative to the hinge bolt, and the fastening component 32 and the pressing block 31 can be pre-installed through the hinge bolt, and the clamping assembly 33 can be tightened after installing the load-bearing rope 2 on the project ground. By providing the pivot assembly 34 at one end of the fastening component 32, the clamping force can be provided to the load-bearing rope 2 by simply tightening the clamping assembly 33. It is avoided that the hinge bolt is provided at both ends of the fastening component 32 and is not easily positioned, causing the upper and lower sides to be non-parallel, causing one end to be loose and the other to be tight. The load-bearing rope 2 is stably limited in the receiving cavity 301 to prevent the load-bearing rope 2 from loosening and causing sagging.

Figure 2:
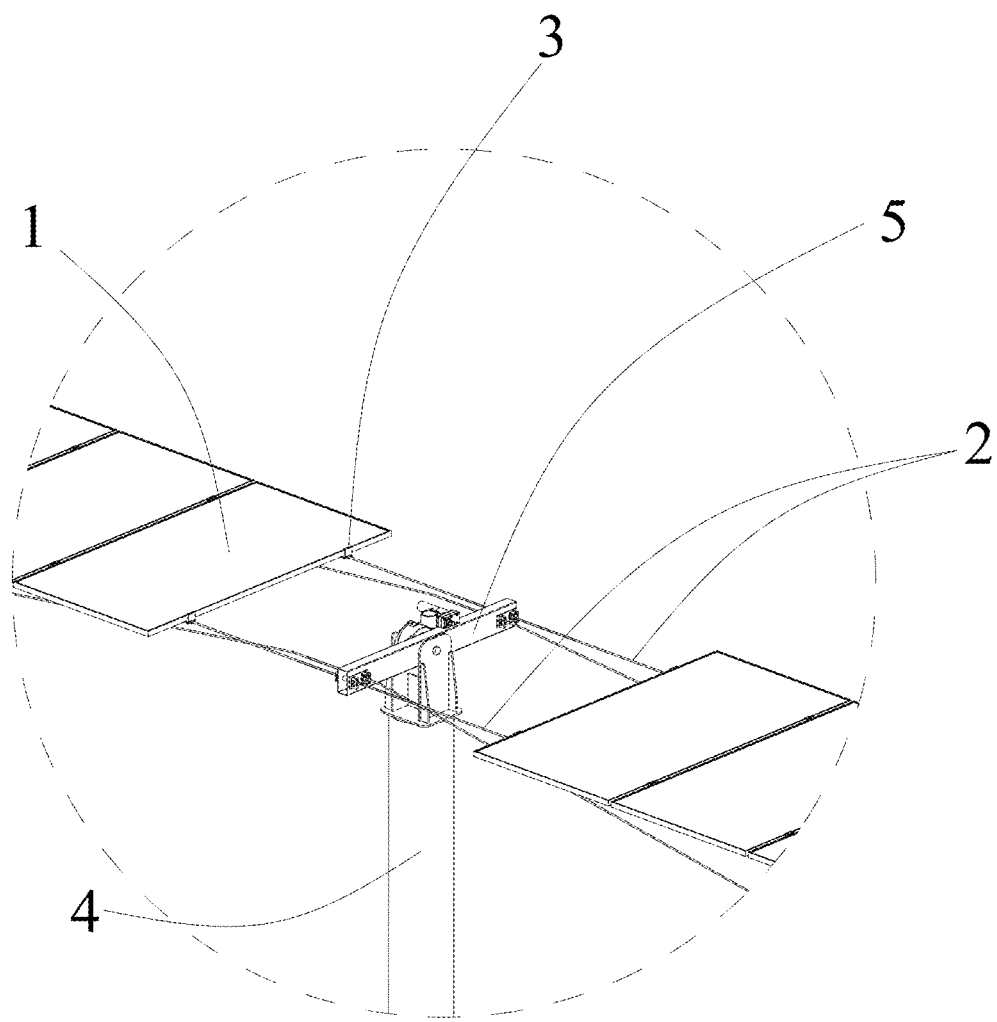
FIG. 2 is an enlarged view of part H in FIG. 1.
Figure 3:
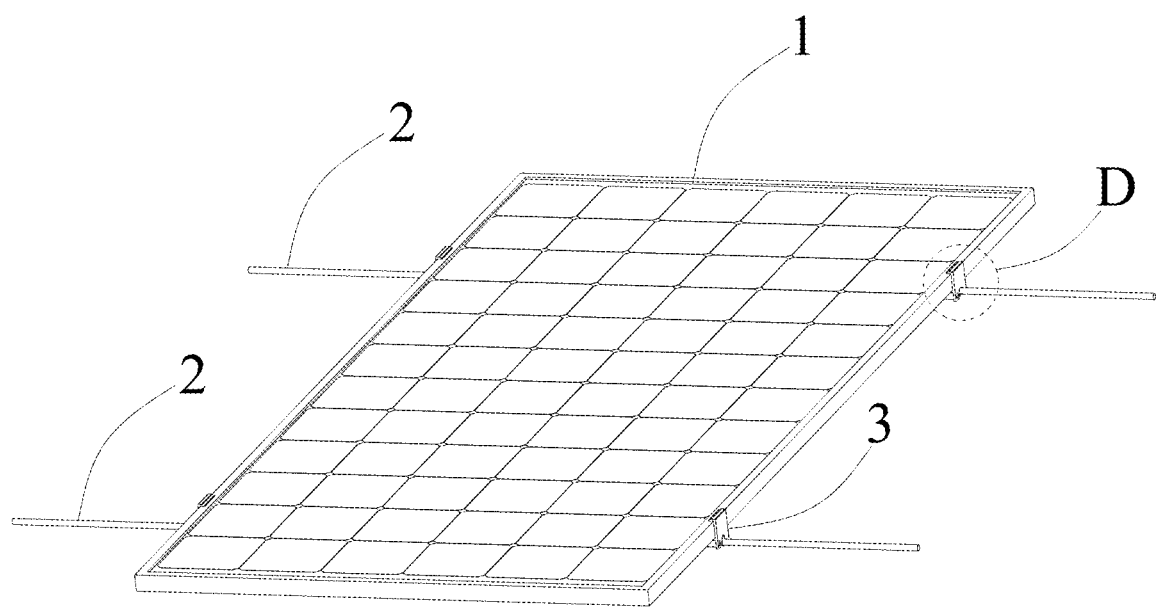
FIG. 3 is a perspective assembled state view of the flexible photovoltaic bracket of the present disclosure.
Figure 4:
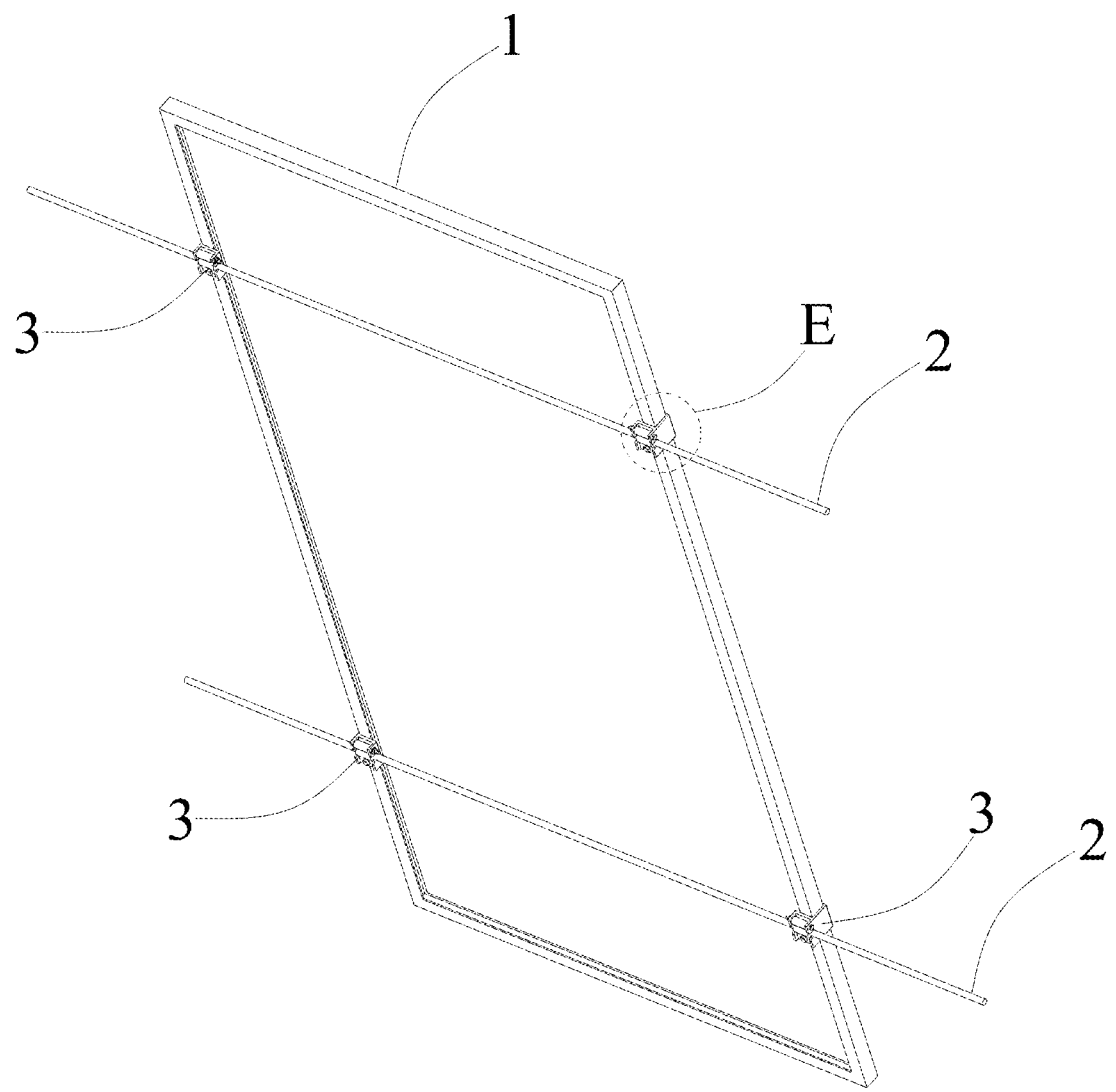
FIG. 4 is another perspective assembled state view of the flexible photovoltaic bracket of the present disclosure.
Figure 5:
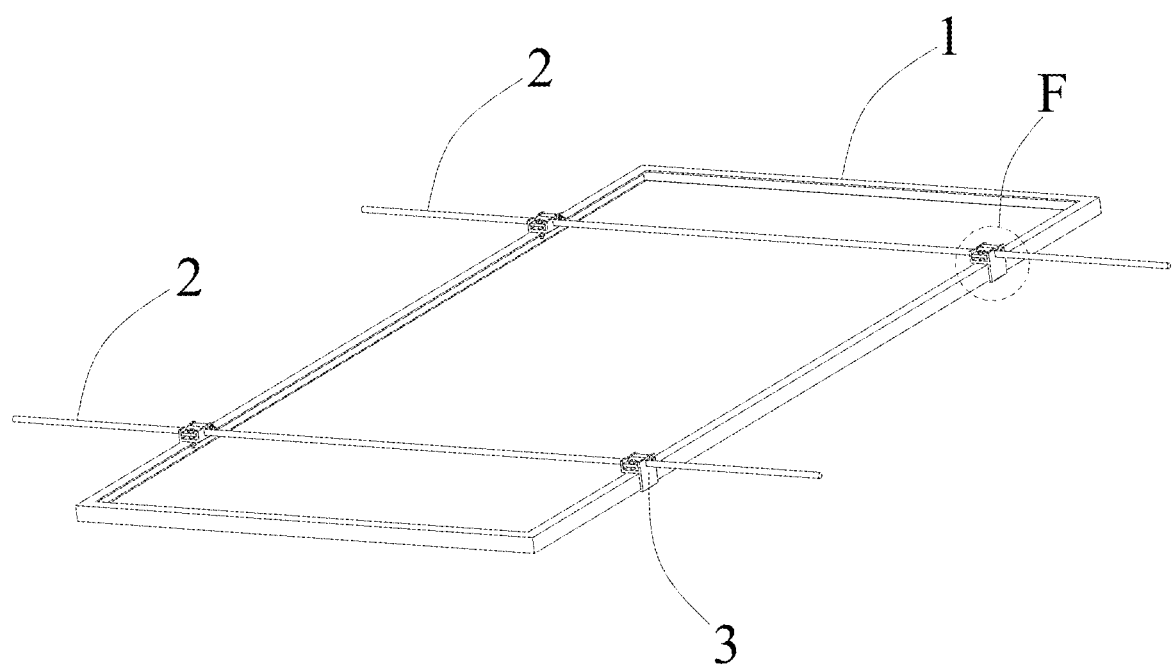
FIG. 5 is yet another perspective assembled state view of the flexible photovoltaic bracket of the present disclosure.
Figure 6:
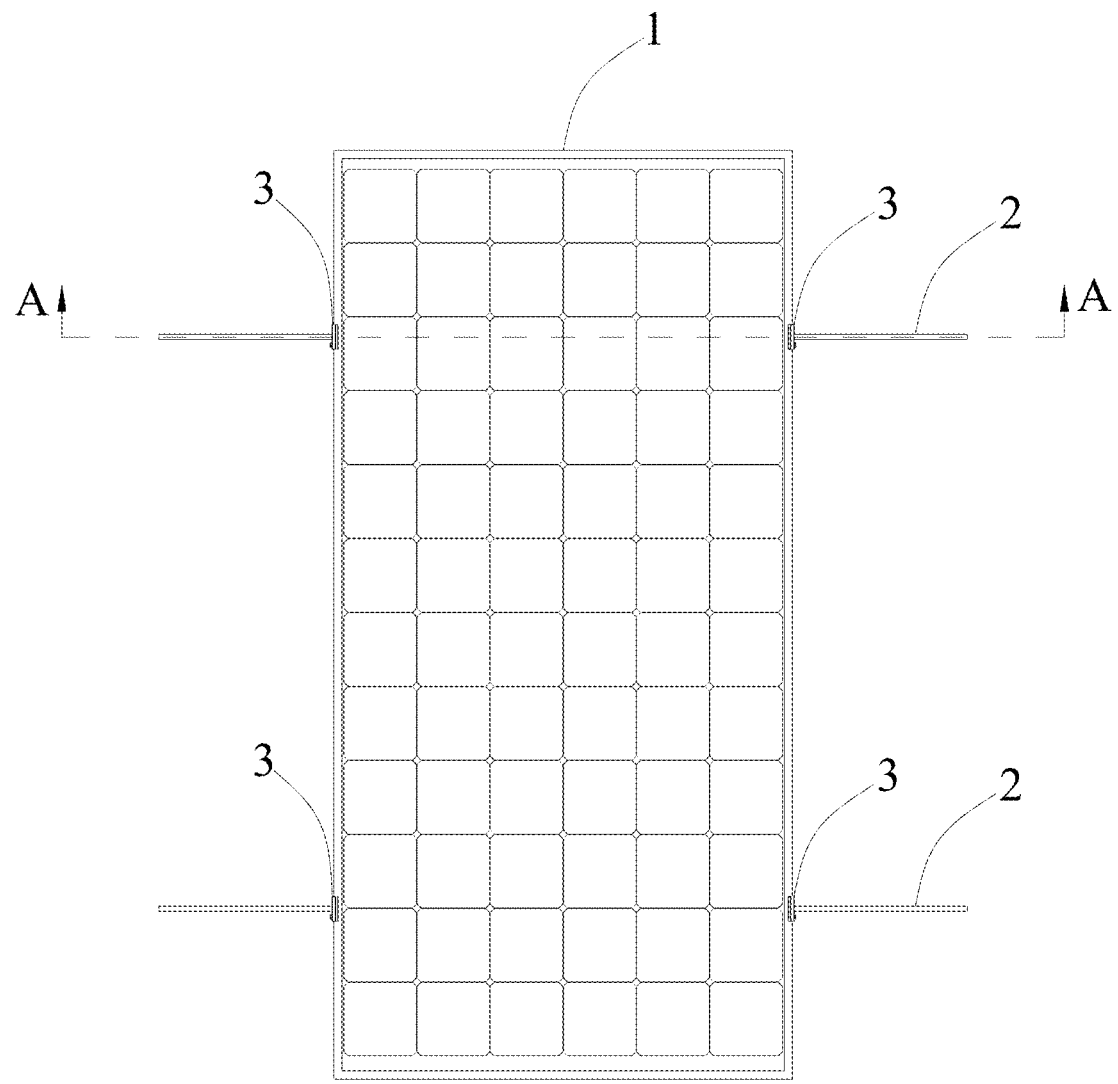
FIG. 6 is a top view of FIG. 3.
Figure 7:
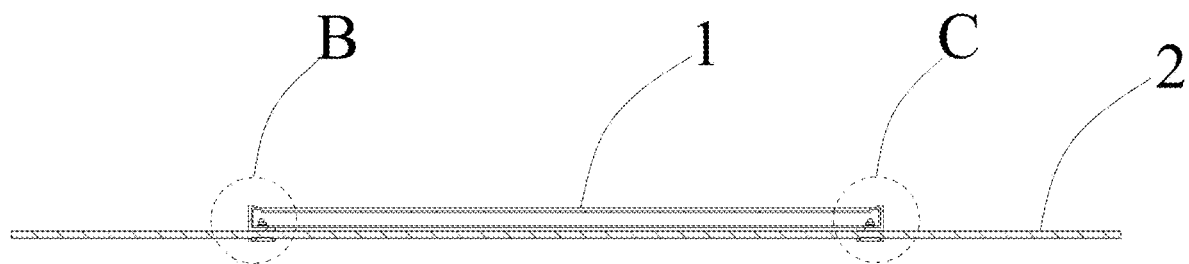
FIG. 7 is a cross-sectional view taken along line A-A in FIG. 6.
Figure 8:
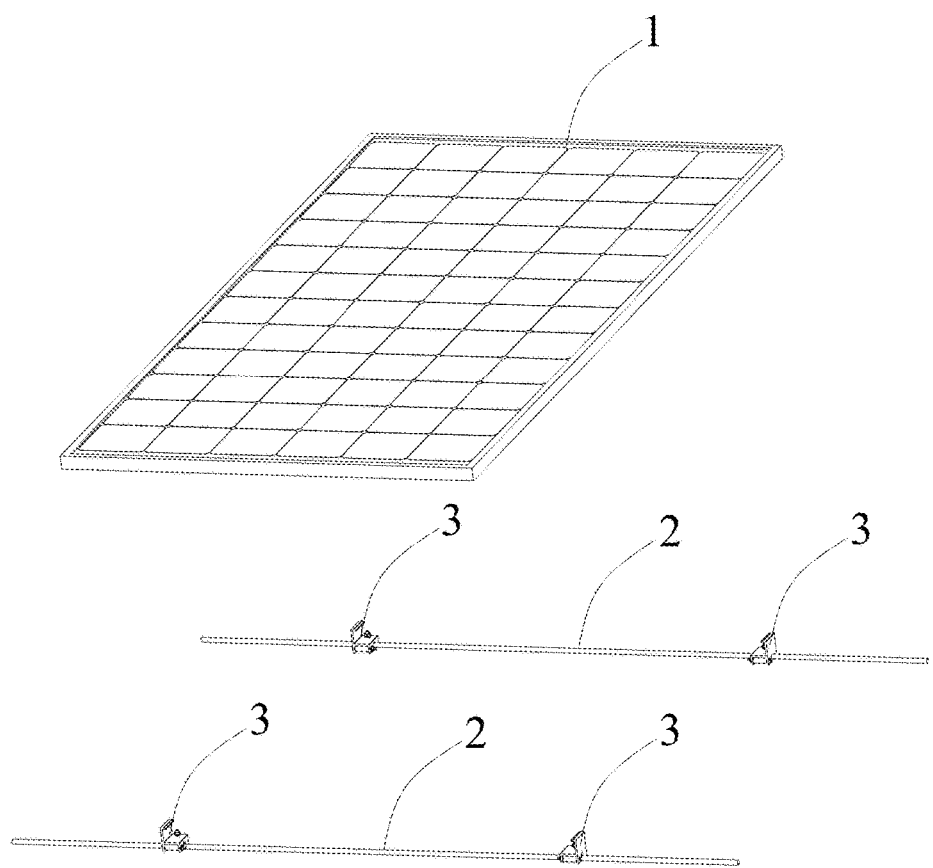
FIG. 8 is a partially exploded perspective view of the flexible photovoltaic bracket of the present disclosure.
Figure 9:
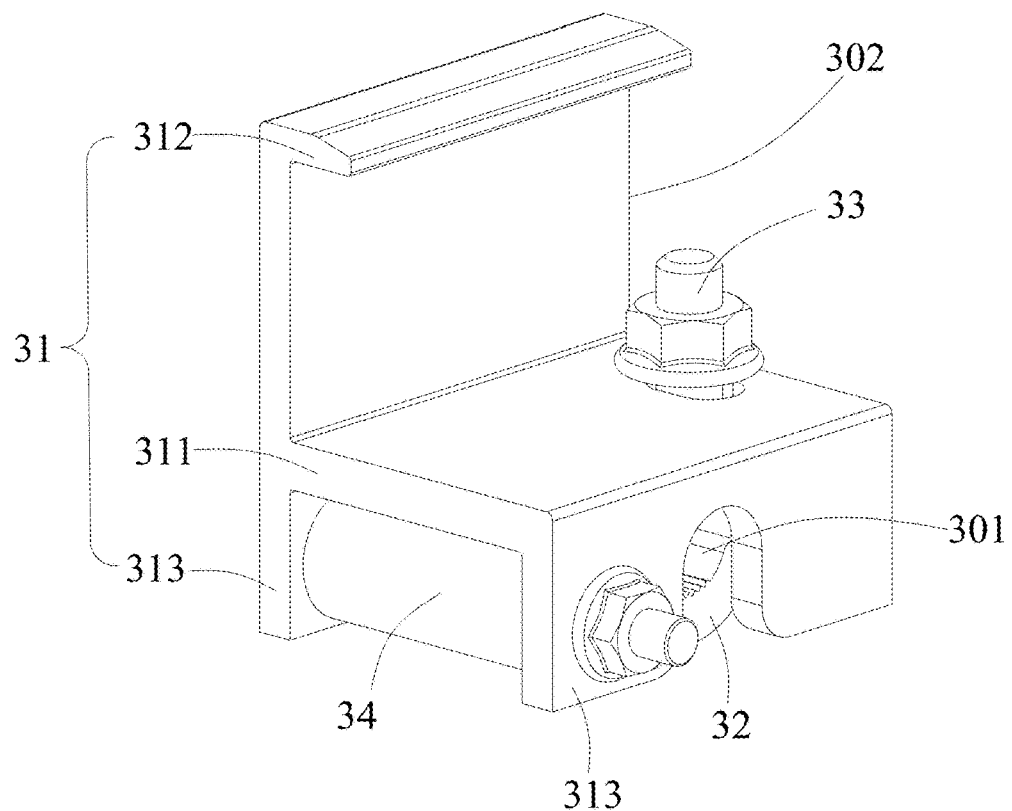
FIG. 9 is a perspective assembly view of a module fastener of the flexible photovoltaic bracket of the present disclosure.
Figure 10:
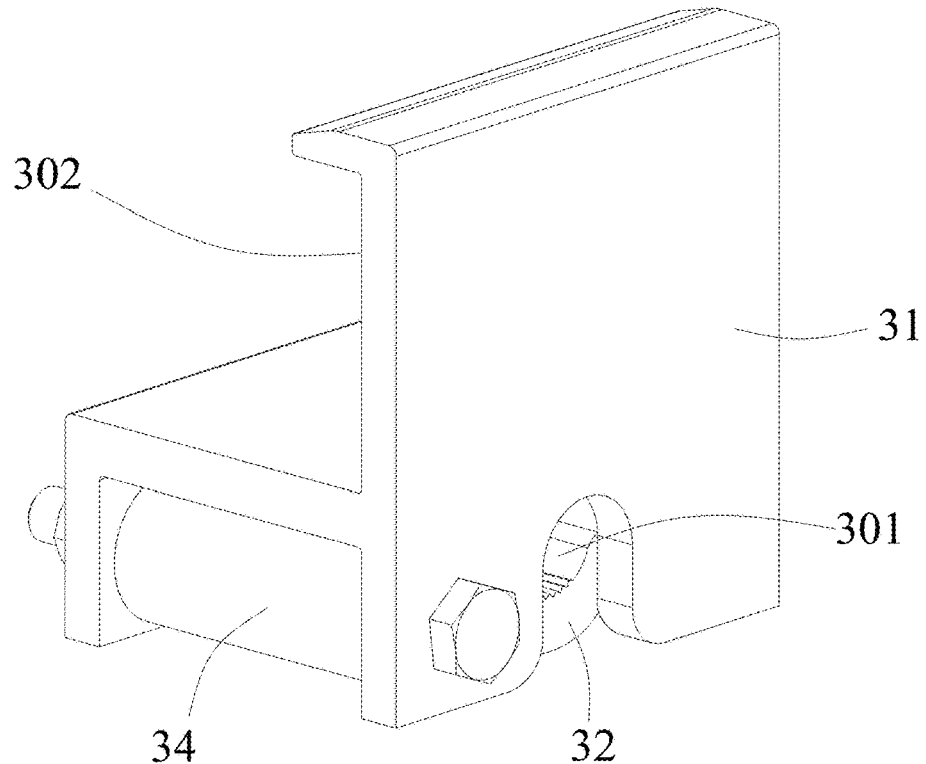
FIG. 10 is another perspective assembly view of the module fastener of the flexible photovoltaic bracket of the present disclosure.

Continuing to refer to FIG. 1 and FIG. 2, as shown in FIG. 1 and FIG. 2, the number of load-bearing ropes 2 of the flexible photovoltaic bracket is two. The two load-bearing ropes 2 are arranged in parallel. Two module fasteners 3 are respectively provided on each load-bearing rope 2 to independently and fixedly connect the photovoltaic module 1 to the load-bearing ropes 2. Compared with adjacent photovoltaic modules 1 connected together, when the photovoltaic module 1 of the present disclosure is vibrated by external influences, the photovoltaic module 1 will rise and fall driven by the load-bearing ropes 2 because the load-bearing ropes 2 are of flexible structures. The flexible photovoltaic bracket of the present disclosure can prevent the frame tearing of the photovoltaic module 1 caused by the ups and downs caused by the external influences, thereby effectively improving the service life of the photovoltaic module 1.

The module fastener 3 of the present disclosure is pressed on the photovoltaic module 1 through the hook portion 312 on the top, so that the contact area with the photovoltaic module 1 is large and the photovoltaic module 1 is fixed more firmly. The present disclosure has the characteristics of convenient installation, stability and reliability. Using the module fastener 3 of this structure allows each photovoltaic module 1 to be installed independently. When the photovoltaic module 1 is vibrated by external influences, the flexible photovoltaic bracket of the present disclosure can prevent the frame of the photovoltaic module 1 from tearing.

The above embodiments are only used to illustrate the present disclosure and do not limit the technical solutions described in the present disclosure. The understanding of this description should be based on those skilled in the art. Although the present disclosure has been described in detail with reference to the above-mentioned embodiments, it is understandable to those skilled in the art that those skilled in the art can still make modifications or equivalent substitutions to the present disclosure. All technical solutions and improvements that do not depart from the spirit and scope of the present disclosure shall be covered by the claims of the present disclosure.

What is claimed is:

1. A flexible photovoltaic bracket, comprising:
a plurality of load-bearing ropes;
a plurality of module fasteners;
a plurality of upright columns; and
a plurality of cross beams, the cross beam being correspondingly arranged on a top of the upright column, the load-bearing rope being fixedly connected to the cross beam and being extended between adjacent cross beams;
wherein each of the module fasteners comprises a pressing block, a fastening component and a clamping assembly; the pressing block and the fastening component are rotationally connected; a receiving cavity is formed between the pressing block and the fastening component to clamp and limit the load-bearing rope; the pressing block comprises a horizontal base plate portion and a hook portion extending upwardly from the horizontal base plate portion; the hook portion is configured to contact a photovoltaic module; the clamping assembly passes through the fastening component and the horizontal base plate portion, and is configured to be fixedly connected to a frame of the photovoltaic module.

2. The flexible photovoltaic bracket according to claim 1, wherein the pressing block further comprises a pair of vertical limiting plate portions extending downwardly from the horizontal base plate portion; the fastening component is pivotally connected to the pair of the vertical limiting plate portions; when the fastening component rotates and is located below the horizontal base plate portion, the vertical limiting plate portions and the fastening component jointly form the receiving cavity which is configured to clamp and limit the load-bearing rope; the hook portion and the horizontal base plate portion jointly form an opening slot which is configured to accommodate the frame of the photovoltaic module.

3. The flexible photovoltaic bracket according to claim 2, wherein the vertical limiting plate portion is provided with a notch portion that opens downwardly; the fastening component is provided with a recessed portion that opens upwardly; the load-bearing rope is located between the notch portion and the recessed portion.

4. The flexible photovoltaic bracket according to claim 3, wherein an inner surface of the recessed portion is serrated in order to match a spiral structure of the load-bearing rope; one end of the fastening component is a pivot end and an opposite end of the fastening component is a free end; the recessed portion is located between the pivot end and the free end.

5. The flexible photovoltaic bracket according to claim 4, wherein an upper surface of the free end and a bottom surface of the horizontal base plate portion are configured to abutted together with zero spacing.

6. The flexible photovoltaic bracket according to claim 1, wherein the clamping assembly comprises a bolt element and a nut element; the nut element is sleeved on the bolt element; the horizontal base plate portion defines a first connection hole; the fastening component defines a second connection hole; the bolt element passes through the first connection hole and the second connection hole.

7. The flexible photovoltaic bracket according to claim 6, wherein after the bolt element passes through the first connection hole and the second connection hole along a vertical direction, the bolt element further passes through a third connection hole which is located at a bottom of the frame of the photovoltaic module.

8. The flexible photovoltaic bracket according to claim 7, wherein the first connection hole and the second connection hole are both waist-shaped holes.

9. The flexible photovoltaic bracket according to claim 8, wherein longitudinally extending length directions of the first connection hole and the second connection hole are arranged in parallel; axes of the first connection hole and the second connection hole are perpendicular to an axis of the third connection hole.

10. The flexible photovoltaic bracket according to claim 8, wherein two load-bearing ropes are provided on the flexible photovoltaic bracket; two module fasteners are respectively provided on each load-bearing rope so as to independently and fixedly connect the photovoltaic module to the load-bearing ropes.

11. A flexible photovoltaic bracket, comprising:
a plurality of load-bearing ropes;
a plurality of module fasteners;
a plurality of upright columns; and
a plurality of cross beams, each cross beam being correspondingly fixed to a top of a corresponding upright column, each load-bearing rope being fixedly connected to the cross beam and being extended between adjacent cross beams;
wherein each of the module fasteners comprises a pressing block, a fastening component and a clamping assembly; the pressing block and the fastening component are rotationally connected, and together form a receiving cavity through which the load-bearing rope extends; the pressing block comprises a horizontal base plate portion and a hook portion extending upwardly from the horizontal base plate portion; the hook portion is configured to hold a photovoltaic module; the clamping assembly passes through the fastening component and the horizontal base plate portion, and is configured to be fixedly connected to a frame of the photovoltaic module.

12. The flexible photovoltaic bracket according to claim 11, wherein the pressing block further comprises a pair of vertical limiting plate portions extending downwardly from the horizontal base plate portion; the fastening component is pivotally connected to the pair of the vertical limiting plate portions; when the fastening component rotates and is located below the horizontal base plate portion, the vertical limiting plate portions and the fastening component jointly form the receiving cavity which is configured to clamp and limit the load-bearing rope; the hook portion and the horizontal base plate portion jointly form an opening slot which is configured to accommodate the frame of the photovoltaic module.

13. The flexible photovoltaic bracket according to claim 12, wherein the vertical limiting plate portion is provided with a notch portion that opens downwardly; the fastening component is provided with a recessed portion that opens upwardly; the load-bearing rope is located between the notch portion and the recessed portion.

14. The flexible photovoltaic bracket according to claim 13, wherein an inner surface of the recessed portion is serrated in order to match a spiral structure of the load-bearing rope; one end of the fastening component is a pivot end and an opposite end of the fastening component is a free end; the recessed portion is located between the pivot end and the free end.

15. The flexible photovoltaic bracket according to claim 14, wherein an upper surface of the free end and a bottom surface of the horizontal base plate portion are configured to abutted together with zero spacing.

16. The flexible photovoltaic bracket according to claim 11, wherein the clamping assembly comprises a bolt element and a nut element; the nut element is sleeved on the bolt element; the horizontal base plate portion defines a first connection hole; the fastening component defines a second connection hole; the bolt element passes through the first connection hole and the second connection hole.

17. The flexible photovoltaic bracket according to claim 16, wherein after the bolt element passes through the first connection hole and the second connection hole along a vertical direction, the bolt element further passes through a third connection hole which is located at a bottom of the frame of the photovoltaic module.

18. The flexible photovoltaic bracket according to claim 17, wherein the first connection hole and the second connection hole are both waist-shaped holes.

19. The flexible photovoltaic bracket according to claim 18, wherein longitudinally extending length directions of the first connection hole and the second connection hole are arranged in parallel; axes of the first connection hole and the second connection hole are perpendicular to an axis of the third connection hole.

20. The flexible photovoltaic bracket according to claim 18, wherein two load-bearing ropes are provided on the flexible photovoltaic bracket; two module fasteners are respectively provided on each load-bearing rope so as to independently and fixedly connect the photovoltaic module to the load-bearing ropes.

* * * * *